(12) United States Patent
Watford et al.

(10) Patent No.: US 9,662,756 B2
(45) Date of Patent: May 30, 2017

(54) POSITIVE FEED TOOL WITH IMPROVED SHIFT FROM FORWARD TO RETRACT

(71) Applicant: Apex Brands, Inc., Apex, NC (US)

(72) Inventors: Jeremy Watford, Irmo, SC (US);
Kevin Myhill, Lexington, SC (US);
Marc Djabri, Le Raincy (FR)

(73) Assignee: Apex Brands, Inc., Apex, NC (US)

( * ) Notice: Subject to any disclaimer, the term of this patent is extended or adjusted under 35 U.S.C. 154(b) by 0 days.

(21) Appl. No.: 14/770,019

(22) PCT Filed: Feb. 24, 2014

(86) PCT No.: PCT/US2014/018031
§ 371 (c)(1),
(2) Date: Aug. 24, 2015

(87) PCT Pub. No.: WO2014/133965
PCT Pub. Date: Sep. 4, 2014

(65) Prior Publication Data
US 2016/0001408 A1    Jan. 7, 2016

Related U.S. Application Data

(60) Provisional application No. 61/822,959, filed on May 14, 2013, provisional application No. 61/769,736, filed on Feb. 26, 2013.

(51) Int. Cl.
*E21B 3/00* (2006.01)
*E21B 17/22* (2006.01)
(Continued)

(52) U.S. Cl.
CPC ............. *B23Q 5/326* (2013.01); *B23Q 5/261* (2013.01); *B23Q 5/263* (2013.01); *B23Q 5/265* (2013.01);
(Continued)

(58) Field of Classification Search
CPC ... B25F 5/001; B25F 5/00; B23B 5/08; B23B 5/168; B23Q 5/326; B23Q 5/261; B23Q 5/323
(Continued)

(56) References Cited

U.S. PATENT DOCUMENTS 1,312,644 A    8/1919   Raab et al.
2,893,272 A *  7/1959   Linsker ................. B23Q 5/326
                                                      74/841
(Continued)

FOREIGN PATENT DOCUMENTS

CN    201519891 U    7/2010
CN    102320011 A    1/2012
(Continued)

*Primary Examiner* — Robert Long
(74) *Attorney, Agent, or Firm* — Coats & Bennett, PLLC

(57) ABSTRACT

Feed tools and methods of use for initiating a change in a spindle feed direction from an advance direction that moves the spindle towards a workpiece to a retract direction that moves the spindle away from the workpiece. The tool and methods may use a thrust overload force that is generated on one or more of the components to initiate the shift from forward to retract and/or a lift ring that acts on one or more of the components. The tool and methods may also include a two-stage piston to accomplish the shift. The various components may be used independently or in combination within the tool.

15 Claims, 11 Drawing Sheets

(51) Int. Cl.
*E21B 19/16* (2006.01)
*E21B 19/18* (2006.01)
*B23Q 5/32* (2006.01)
*B25F 5/00* (2006.01)
*B25F 5/02* (2006.01)
*B23Q 5/26* (2006.01)
*B25B 21/00* (2006.01)
*B23Q 11/04* (2006.01)
*B25F 3/00* (2006.01)
*F16K 1/34* (2006.01)
*F16K 27/02* (2006.01)
*F16K 31/122* (2006.01)

(52) U.S. Cl.
CPC .............. *B23Q 11/04* (2013.01); *B25B 21/00* (2013.01); *B25F 3/00* (2013.01); *B25F 5/00* (2013.01); *B25F 5/001* (2013.01); *B25F 5/02* (2013.01); *F16K 1/34* (2013.01); *F16K 27/02* (2013.01); *F16K 31/1225* (2013.01)

(58) Field of Classification Search
USPC ......... 173/1–4, 10–11, 13, 39, 45, 141, 213, 173/216
See application file for complete search history.

(56) References Cited

U.S. PATENT DOCUMENTS

| | | | |
|---|---|---|---|
| 3,411,385 A | 11/1968 | Quackenbush | |
| 3,577,807 A * | 5/1971 | Alexander | B23B 45/04 408/17 |
| 4,538,942 A * | 9/1985 | Vindez | B23Q 5/326 173/146 |
| 4,612,831 A * | 9/1986 | Lehmkuhl | B23B 29/03457 408/159 |
| 4,850,753 A * | 7/1989 | Dudden | B23Q 5/326 173/19 |
| 5,205,681 A | 4/1993 | Eckman | |
| 5,860,446 A | 1/1999 | Hunt | |
| 6,193,447 B1 * | 2/2001 | Thames | B23Q 5/326 408/1 R |
| 6,196,772 B1 * | 3/2001 | Thames | B23Q 5/326 408/1 R |
| 6,261,033 B1 * | 7/2001 | Thames | B23Q 5/326 408/1 R |
| 7,048,077 B2 * | 5/2006 | Veres | B23Q 5/326 173/145 |
| 7,806,637 B2 | 10/2010 | Oehninger et al. | |
| 8,469,641 B2 | 6/2013 | Jaillon | |
| 8,522,941 B1 * | 9/2013 | Eldessouky | F16D 7/044 192/69.81 |
| 9,120,160 B1 * | 9/2015 | Eldessouky | B23B 45/04 |
| 2008/0260485 A1 | 10/2008 | Jaillon et al. | |
| 2010/0300713 A1 * | 12/2010 | Kume | B23B 29/03482 173/4 |
| 2011/0023667 A1 * | 2/2011 | Kume | B23B 41/04 82/1.3 |
| 2013/0168118 A1 * | 7/2013 | Yamane | B23Q 5/04 173/29 |
| 2014/0238711 A1 * | 8/2014 | Myhill | B25F 5/001 173/1 |
| 2016/0001435 A1 * | 1/2016 | Watford | B25F 5/001 173/1 |

FOREIGN PATENT DOCUMENTS

| | | | |
|---|---|---|---|
| CN | 103170686 A | 6/2013 | |
| DE | 60007004 T2 | 9/2004 | |
| EP | 0060186 A2 | 9/1982 | |
| EP | 0143158 A1 | 6/1985 | |
| EP | 1618978 A1 | 1/2006 | |
| EP | 1916045 A1 | 4/2008 | |
| FR | 1618978 A1 * | 1/2006 | ............ B23B 35/00 |
| FR | 2881366 A1 | 8/2006 | |
| GB | 2195164 A | 3/1988 | |
| WO | 0078502 A2 | 12/2000 | |
| WO | WO 0078502 A2 * | 12/2000 | ............ B23Q 5/326 |
| WO | 0105559 A2 | 1/2001 | |

* cited by examiner

POSITIVE FEED TOOL WITH IMPROVED SHIFT FROM FORWARD TO RETRACT

RELATED APPLICATIONS

The present application claims priority to U.S. Application No. 61/769,736 filed on Feb. 26, 2013 entitled Feed Drill and U.S. Application No. 61/822,959 filed on May 14, 2013 entitled Feed Drill.

BACKGROUND

Positive feed tools, such as but not limited to feed drills, are conventionally known for performing operations on workpieces formed of substances such as steel, aluminum, titanium, and composites. Positive feed tools include a tool feed mechanism that feeds a bit into a work piece. Conventional applications for positive feed tools include, among other applications, drilling holes in various parts of aircraft.

Positive feed tools general include a motor configured to drive a spindle. The spindle may be rotated, and may advance a predetermined amount per revolution. The spindle is designed to move in an advance direction towards a workpiece, and a retract direction away from the workpiece.

Tools 10 are designed to initiate a shift in the spindle from moving in the advance direction to moving in the retract direction. Typical methods for initiating the shift from advance to retract are mechanical cam levers or pneumatic pistons actuated by a pneumatic limit signal. Reliability of the operation of these mechanisms is vital for the operation of the tool. Failure of the mechanisms at this point may result in a disabled tool stuck with the spindle in the forward position. This can cause damage to the workpiece and/or the tool.

SUMMARY

The present application is directed to positive feed tools configured to initiate a shift in the spindle from an advance direction to a retract direction.

One embodiment is directed to a positive feed tool configured to operate in a first mode and a second mode. The feed tool includes an elongated spindle adapted to carry a tool bit and to rotate and to move axially along a feed path. The spindle is configured to operate in a first mode to move axially along the feed path in a first direction and a second mode to move axially along the feed path in an opposing second direction. The spindle is further configured to prevent movement in the first direction beyond a stop position. A spindle drive mechanism is connected to the spindle to rotate the spindle. A differential feed gear engages with and is rotated by the spindle drive mechanism and is spaced away from the spindle. A spindle feed gear connected to the spindle to axially move the spindle along the feed path. The spindle feed gear is engaged with and rotated by the differential feed gear. The first mode includes the spindle drive mechanism engaged with the spindle to rotate the spindle and engaged with the differential feed gear to rotate the spindle feed gear. The spindle feed gear is located at a first axial position along the feed path and the spindle drive mechanism and the differential feed gear being a first axial distance apart. The second mode includes the spindle feed gear at a different second axial position along the feed path and the differential feed gear a greater second distance axially apart from and disengaged from the spindle drive mechanism. The spindle is configured to transition from the first mode to the second mode in response to the spindle feed gear axially being moved along the feed path from the first position to the second position.

The feed tool may include a lift ring that axially moves along the feed path with the spindle feed gear. The lift ring extends radially outward beyond the spindle feed gear to contact against the differential feed gear when the spindle feed gear moves from the first axial position to the second axial position.

The lift ring and the spindle feed gear may be a single component.

The lift ring may extend around the spindle and include a central opening that receives the spindle.

The feed tool may include one or more ramps that extend axially outward from each of the spindle drive mechanism and the differential feed gear with the ramps each including cam surfaces that contact together to engage together the spindle drive mechanism and the differential feed gear in the first mode.

The feed tool may include a biasing member that acts on the spindle feed gear to prevent movement of the spindle feed gear from the first axial position to the second axial position.

The feed tool may include an air motor that applies a force to the spindle drive mechanism to rotate the differential feed gear and the spindle feed gear.

The feed tool may include a piston operatively connected to the differential feed gear through a shaft with the piston positioned in a cylinder that includes an air inlet.

Another embodiment is directed to a feed tool that includes an elongated spindle adapted to carry a tool bit. The spindle is configured to axially move along a feed path in a forward direction to a first position and to retract in an opposing direction. A spindle drive gear is connected to the spindle to rotate the spindle. A spindle feed gear is connected to the spindle to axially move the spindle along the feed path. A differential feed gear is engaged with the spindle feed gear via mating gear teeth. A differential drive gear is engaged with the spindle drive gear via mating gear teeth and further engaged with the differential feed gear. The differential drive gear is powered to rotate the spindle drive gear, and also to rotate the spindle feed gear through the differential feed gear. The spindle feed gear is operatively connected to the spindle to move axially along the feed path after the spindle reaches the first position. The movement of the spindle feed gear causes the differential feed gear to move away from the differential drive gear and to disengage the differential feed gear from the differential drive gear.

The spindle drive gear and the spindle feed gear may be axially aligned along the spindle, and the differential drive gear and the differential feed gear may be axially aligned along a differential feed shaft and are axially engaged together with the spindle and the differential feed shaft being parallel.

The differential drive gear may include gear teeth along an outer periphery that engage with the spindle drive gear when the spindle moves in the forward direction, and the differential feed gear may include gear teeth along an outer periphery that engage with the spindle feed gear when the spindle moves in the forward direction.

The differential drive gear may be powered to rotate the spindle drive gear and also to rotate the spindle feed gear through the differential feed gear.

The feed tool may also include a biasing member that applies force to the spindle feed gear to bias the spindle feed gear along the feed path in the forward direction.

The spindle feed gear may include a lift ring that extends radially outward beyond the spindle feed gear. The lift ring may contact against an axial face of the differential feed gear to move the differential feed gear away from the differential drive gear when the spindle moves axially along the feed path after the spindle reaches the first position.

The spindle feed gear and the lift ring may be separate and may be axially spaced along the spindle.

Each of the differential feed gear and the differential drive gear may include one or more ramps with inclined faces that contact together to engage the differential drive gear with the differential feed gear.

The differential feed gear may be fixedly attached to the differential feed shaft and the shaft may be axially movable relative to the differential drive gear with a piston fixedly attached to the differential feed shaft.

Another embodiment is directed to a method of initiating a shift in a spindle direction in a positive feed tool. The method includes rotating a spindle drive mechanism that is connected to a spindle thereby rotating the spindle. The method includes rotating the spindle drive mechanism thereby rotating a differential feed gear that is engaged with the spindle drive mechanism. The method includes rotating the differential feed gear thereby rotating a spindle feed gear that is engaged with the differential feed gear. The method includes rotating the spindle feed gear that is connected to the spindle while the spindle is rotating and moving the spindle in a first direction along a feed path. The method includes preventing the spindle from moving in the first direction while continuing to rotate the spindle and the spindle feed gear and begin moving the spindle feed gear axially along the spindle in an opposing second direction along the feed path. The method includes moving the spindle feed gear axially along the spindle in the second direction and moving the differential feed gear away from the spindle drive mechanism and disengaging the differential feed gear from the spindle drive mechanism. The method also includes stopping rotation of the spindle feed gear while continuing to rotate the spindle and moving the spindle in the second direction along the feed path.

The method may also include contacting a lift ring that extends radially outward from the spindle feed gear against the differential feed gear while the spindle feed gear is moving axially along the spindle in the second direction and moving the differential feed gear away from the spindle drive mechanism.

The lift ring may be integrally formed with the spindle feed gear.

The method may also include moving the spindle feed gear against a biasing member while moving the spindle feed gear axially along the spindle in the second direction and increasing a torque necessary to rotate the spindle feed gear.

The method may also include sliding cam faces on the spindle drive mechanism against opposing cam faces on the differential feed gear and moving the differential feed gear away from the spindle drive mechanism.

The method may also include applying air pressure against a piston that is connected to the differential feed gear and moving the differential feed gear away from the spindle drive mechanism.

The method may also include exposing a limited area of a piston that is connected to the differential feed gear to air flow that is moving through an air inlet prior to the moving the differential feed gear away from the spindle drive mechanism and exposing a larger area of the piston to the air flow after the differential feed gears begins to move away from the spindle drive mechanism.

The various aspects of the various embodiments may be used alone or in any combination, as is desired.

DETAILED DESCRIPTION

The present application is directed to a positive feed tool and methods of use for initiating a change in a spindle feed direction from an advance direction that moves the spindle towards a workpiece to a retract direction that moves the spindle away from the workpiece. The tool and methods may use a thrust overload force that is generated on one or more of the components to initiate the shift from forward to retract and/or a lift ring that acts on one or more of the components. The tool and methods may also include a two-stage piston to accomplish the shift. The various components may be used independently or in combination within the tool.

Figure 1:
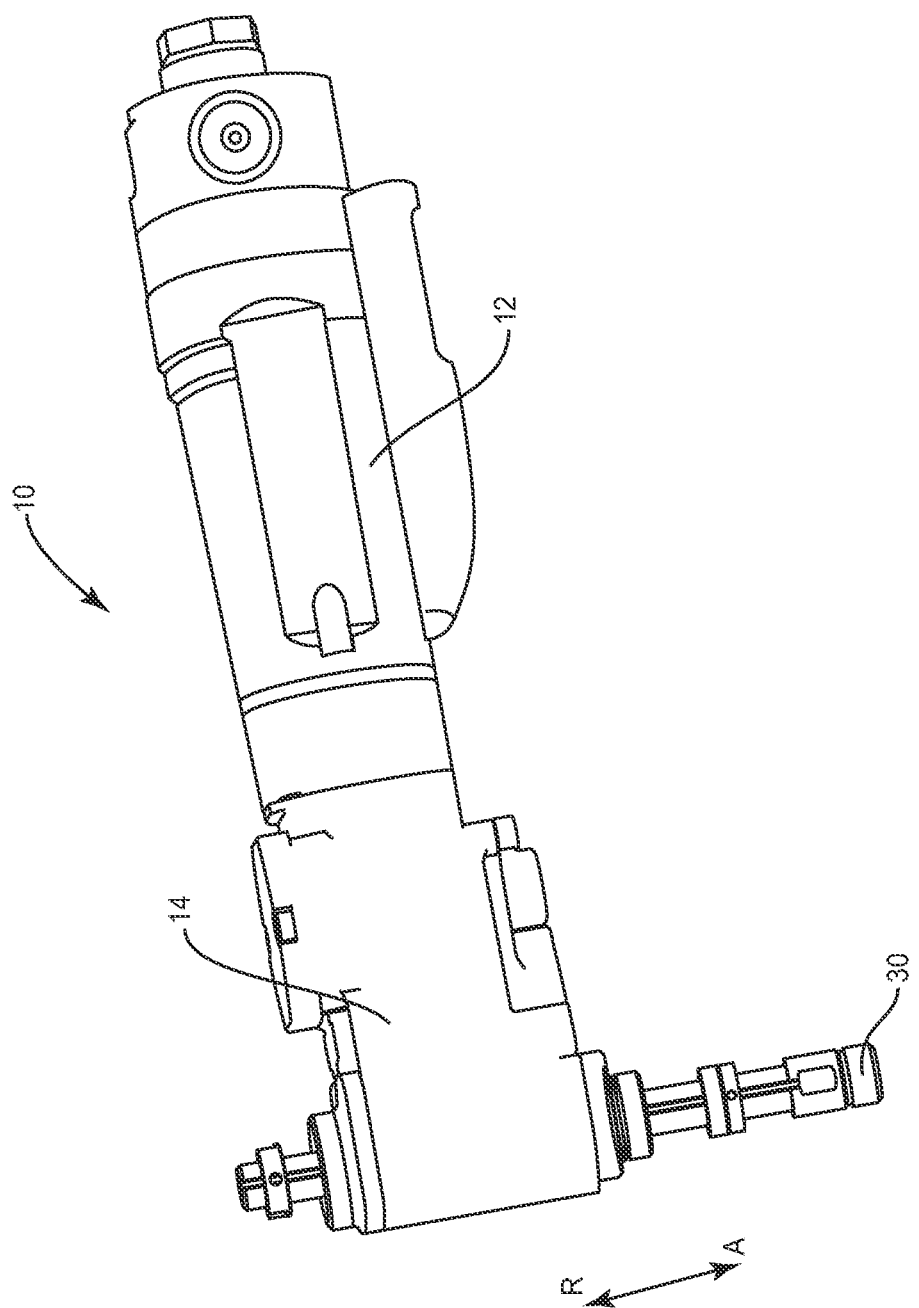
FIG. 1 is a perspective view of a right-angle tool.
Figure 2:
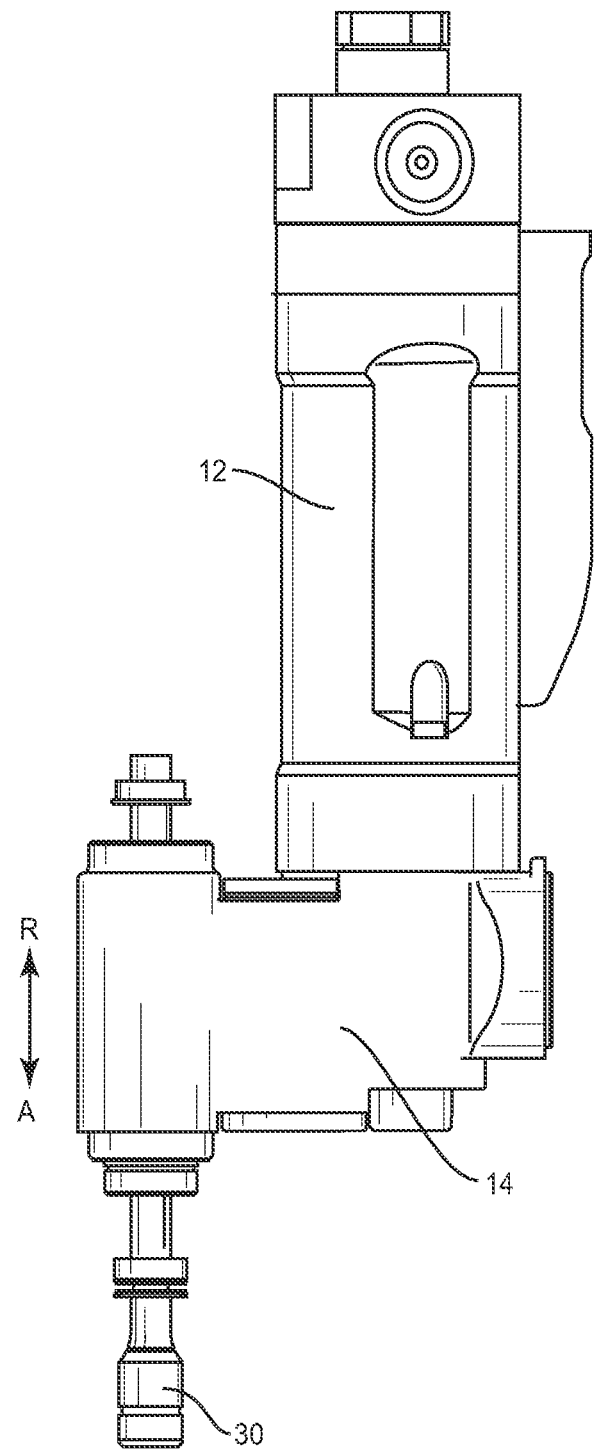
FIG. 2 is a perspective view of an in-line tool.

The tool 10 generally includes a motor 12 and a gear head 14 that includes the spindle 30. FIG. 1 illustrates an example of a positive feed tool, specifically a right-angle positive feed tool 10. FIG. 2 shows a positive feed tool 10 with an inline configuration. Right angle and inline refer to the position of a motor 12 relative to an axis of a spindle 30. The positive feed tool 10 generally includes a spindle 30 that, in addition to rotating, advances a predetermined amount per revolution toward the workpiece to be drilled. The spindle 30 is designed to move in the advance direction A towards a workpiece and in a retract (i.e., reverse) direction R away from the workpiece. The motor 12 may be powered by a pressurized air source, hydraulic/fluid operation (not illustrated), or electric power source (not illustrated).

Figure 3A:
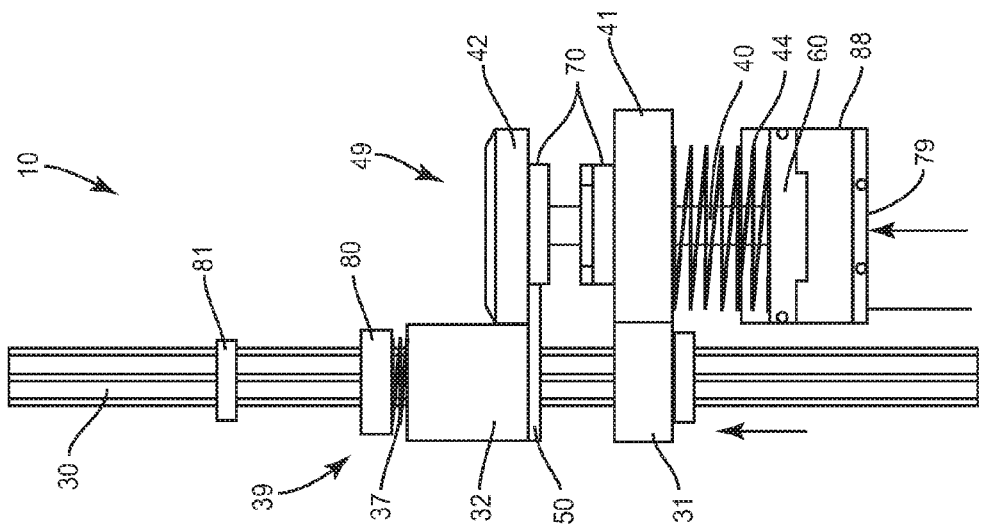
FIG. 3A is a side schematic side view of components of a tool operating in an advance direction.
Figure 3B:
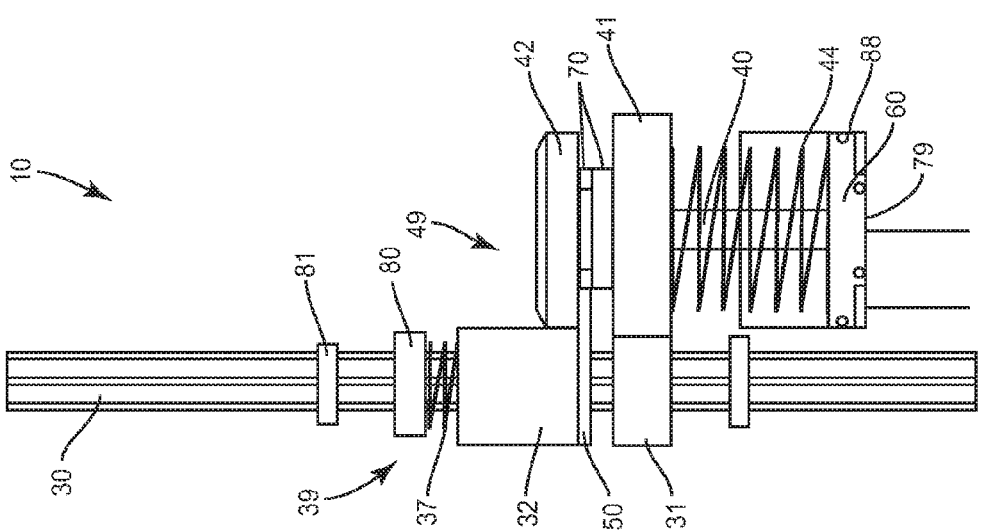
FIG. 3B is a side schematic side view of components of a tool operating in a retract direction.

FIGS. 3A and 3B provide an overview of the aspects of the tool 10 that moves the spindle 30 in the advance direction (FIG. 3A) and the retract direction (FIG. 3B). The tool 10 generally includes a spindle unit 39 and a differential unit 49. The units 39, 49 are generally aligned parallel to one another within the interior of a gear head 14. The spindle unit 39 includes one or more of the spindle 30, spindle drive gear 31, spindle feed gear 32, and a lift ring 50. The differential unit 49 includes one or more of the differential drive gear 41, differential feed gear 42, piston 60, and a feed shaft 40.

The spindle 30 is an elongated member that includes one or more slots for engagement with the drive gear 31 and threads for engagement with the feed gear 32. The drive gear 31 and feed gear 32 each include an annular shape with a central opening to receive the spindle 30. The drive gear 31 includes one or more tangs that engage in the one or more slots in the spindle 30, and the feed gear 32 includes threads to engage with the threads along the spindle 30. Teeth extend around the outer periphery of each gear 31, 32 to engage with corresponding gears in the differential unit 49.

The spindle 30 may extend through a support 80, which may include a housing that extends around the gear head 14. The support 80 remains stationary during rotation and axial movement of the spindle 30. A depth stop member 81 may be attached to the spindle 30 to control and extent of axial movement of the spindle 30 in the advance direction. The depth stop 81 is attached to the spindle 30 and moves axially with the spindle 30. In one or more embodiments, the depth stop 81 is a collar that is threaded onto the spindle 30. The depth stop 81 extends radially outward from the spindle 30 and is sized to contact against the support 80 to prevent additional axial movement of the spindle 30 in the advance direction. To prevent damage, the support 80 may include a bearing at the point at which the spindle 30 can no longer be driven forward. A biasing device 37 is positioned between the spindle feed gear 32 and the support 80.

In the differential unit 49, each of the drive gear 41 and feed gear 42 extend around the feed shaft 40 and include teeth around their periphery to engage with the corresponding gears 31, 32 of the spindle unit 39. The piston 60 is positioned in a cylinder 88 below the gears 41, 42. The feed shaft 40 is attached to the piston 60 and differential feed gear 42 to axially move as a unit. The differential drive gear 41 extends around the feed shaft 40 but does not axially move with the feed shaft 40. A biasing member 44 extends along the feed shaft 40 between the piston 60 and the differential drive gear 41. Air is directed towards an inlet 79 at a bottom of the cylinder 88.

The gears 31, 32, 41, 42 of the spindle unit 39 and the differential unit 49 are configured to provide rotation and feed (advance and retract) to the spindle 30. The differential drive gear 41 is driven through the motor 12. Differential drive gear 41 engages with spindle drive gear 31 which is operatively connected to the spindle 30 to thereby provide rotation to the spindle 30. The differential drive gear 41 is also operatively connected to and rotates the differential feed gear 42. The differential feed gear 42 engages with the spindle feed gear 32 which is threaded onto the spindle 30. The feed gears 32, 42 provide for the spindle 30 to move in the advance and retract directions with the rate and direction of feed based on ratios between the drive gear 41/drive gear 31 and the feed gear 42/feed gear 32. In one or more embodiments, the thread on the spindle 30 is made left hand such that feed in the advance direction is achieved by rotating the spindle feed gear 32 faster than the spindle drive gear 31. In another embodiment, the spindle 30 is made right-handed such that the feed in the advance direction is achieved by rotating the spindle feed gear 32 slower than the spindle drive gear 31.

To move the spindle 30 in the retract direction, the differential feed gear 42 is disengaged from the differential drive gear 41 and held stationary. This causes the spindle feed gear 32 to also become stationary. The spindle 30 retracts as it is still being rotated by the drive gear 31.

Figure 4:
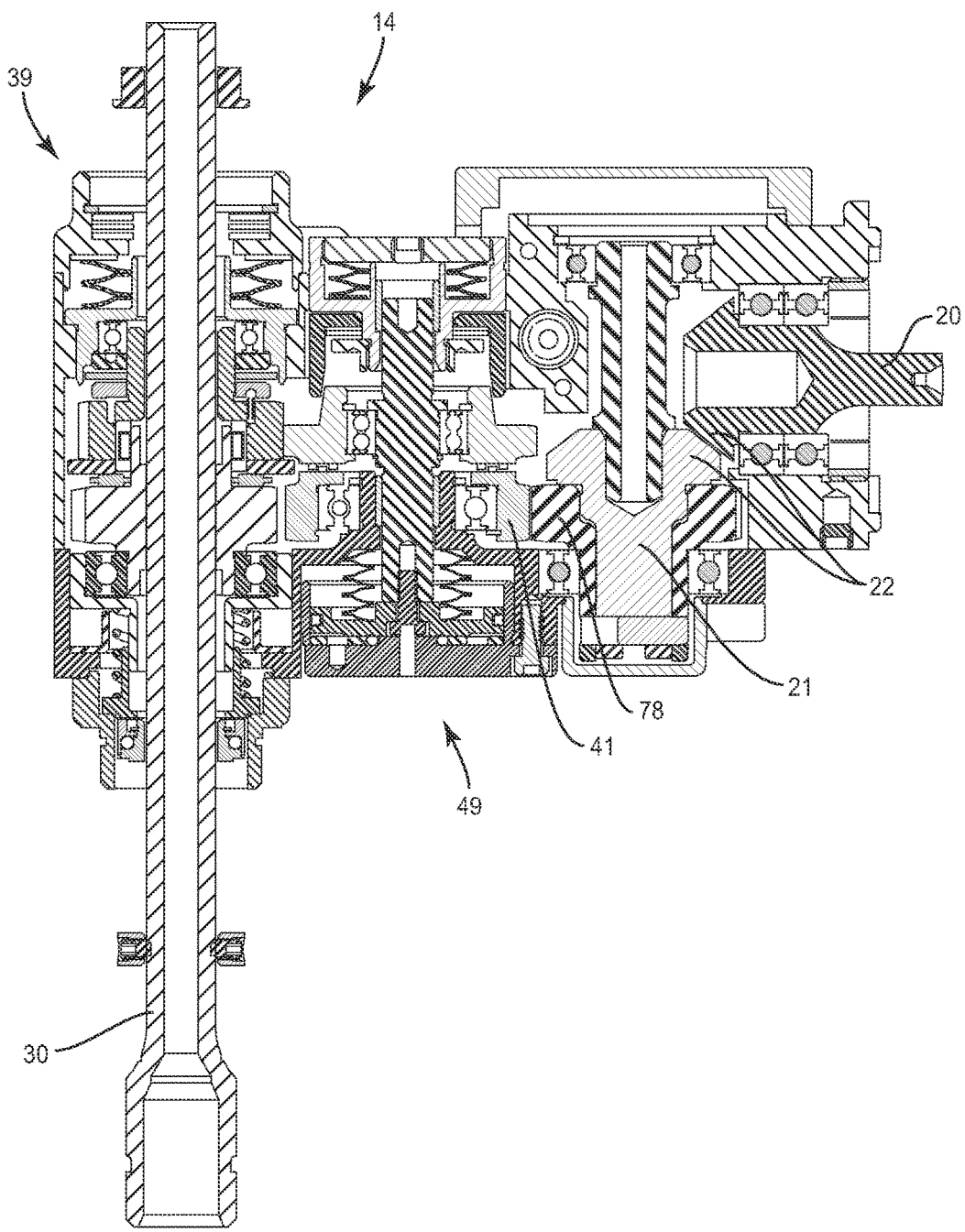
FIG. 4 is a side sectional view of a gear head.

The spindle unit 39 and the differential unit 49 form the gear head 14 configured to be attached to the motor 12. FIG. 4 illustrates a side schematic view of a right angle feed gear head 14 separated from the motor 12. The tool 10 includes an input shaft 20 driven that is drive by the motor 12 (not illustrated in FIG. 4). For the right-angle version, a set of bevel gears 22 is employed to provide rotation to an input gear 78 attached to the driven bevel gear 21 to engage with and provide a driving force to the differential drive gear 41. Thus, the input gear 78 is configured to provide a force to rotate the differential drive gear 41 (and thus the operatively connected differential feed gear 42, spindle drive gear 31, and spindle feed gear 32). A similar configuration is used for an inline tool with the input gear 78 being driven by the motor 12 either directly or through reduction gear boxes commonly called planetary gear boxes. For both a right angle gear head 14 and inline gear head 14, the spindle unit 39 and differential unit 49 are substantially the same.

In one or more embodiments, the positive feed tool 10 uses a pressurized air supply for the motor power. This same air supply is then used to control certain other functions within the overall tool operation. In one or more embodiments that include an electric motor 12, a separate pressurized air supply provides these control functions or a similar electric actuation control is used. In one or more embodiments, the piston 60 and the cylinder 88 are supplied with air from the pressurized air supply. Supply of the air is controlled by the air logic system within the tool 10.

Figure 6:
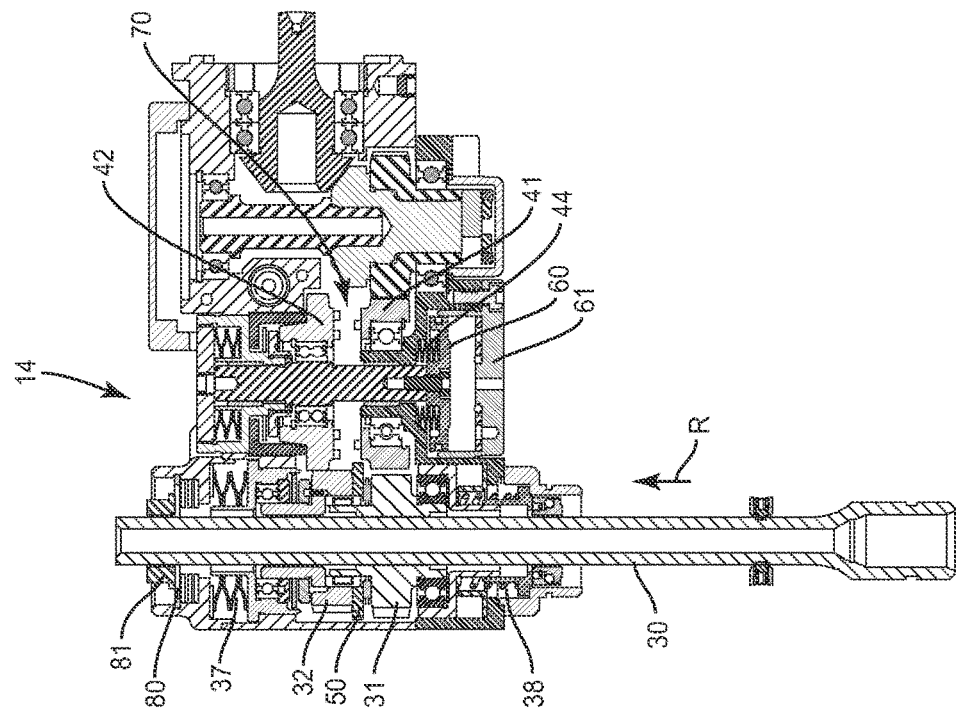
FIG. 6 is a side sectional view of a gear head in a retract operation.
Figure 5:
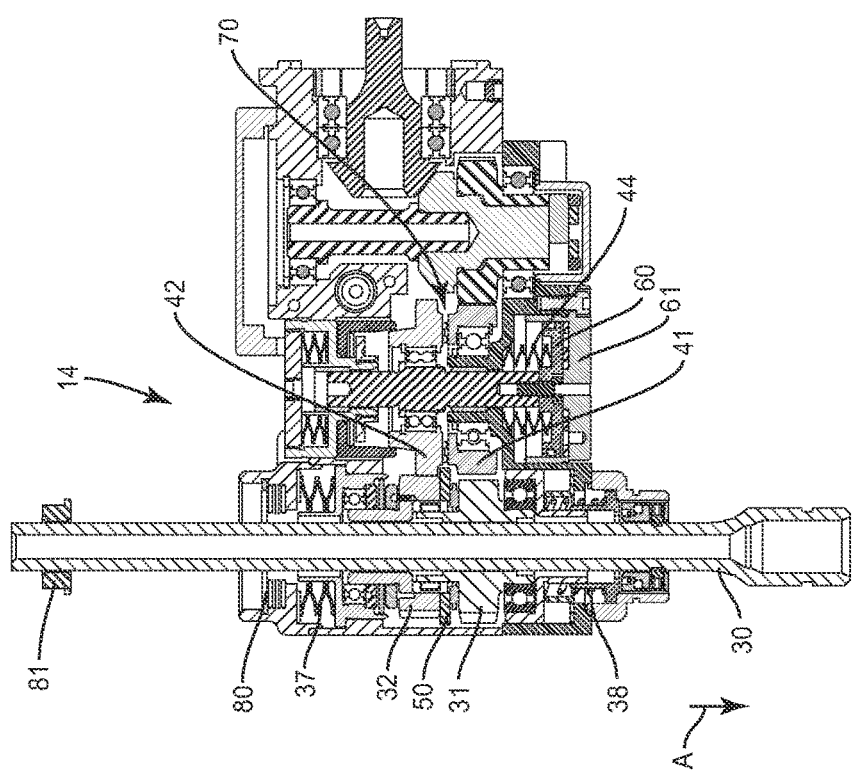
FIG. 5 is a side sectional view of a gear head in a forward feed operation.

FIGS. 5 and 6 illustrate that the spindle 30 is caused to rotate and axially move by rotating the spindle drive gear 31 and the spindle feed gear 32 respectively with the differential drive gear 41 and the differential feed gear 42. The spindle feed gear 32 includes internal threads that are threaded onto external threads that extend along the spindle 30. Hence, when the spindle feed gear 32 is rotated in relation to the spindle 30, the spindle 30 will feed in the advance direction through the spindle feed gear 32. In one or more embodiments, external threads of the spindle 30 are left-handed threads. The spindle 30 also includes slots that extend along its length. The spindle drive gear 31 includes internal male splines that engage with the drive grooves on the spindle 30. Thus, when the spindle drive gear 31 is rotated, the spindle 30 also rotates.

FIG. 5 illustrates the gear head 14 operating to move the spindle 30 in the advance direction indicated by arrow A. As illustrated, the differential feed gear 42 is engaged with and rotated by the differential drive gear 41. The differential feed gear 42 in turn rotates the spindle feed gear 32 that is engaged with the spindle 30. The rotation of the spindle feed gear 32 about the spindle 30 axially drives the spindle 30 in the advance direction A. The extent of movement of the spindle 30 may be set by the depth stop 81 that contacts against the support 80 at the maximum depth.

The tool 10 is configured to change the feed direction to retract the spindle 30 after this desired amount of axial movement of the spindle 30 in the advance direction A. To change the gear head 14 to retract, the differential feed gear 42 is disengaged from the differential drive gear 41. The disengagement results in the differential feed gear 42 being held stationary. Because the spindle feed gear 32 is driven through the differential feed gear 42, the spindle feed gear 32 also becomes stationary. With the spindle 30 still being driven by the spindle drive gear 31 (through the differential drive gear 41), the spindle 30 is caused to retract due to the threads along the length of the spindle 30 that are engaged in the spindle feed gear 32.

The feed tool 10 may include one or more aspects to improve the operational reliability of shifting from feed to retract. This may include one or more of a torque overload clutch 70 formed between the differential feed gear 42 and the differential drive gear 41, a mechanical lift ring 50 that axially moves the differential feed gear 42, and a two-stage piston 60. In one or more embodiments, the tool 10 includes each of these aspects. Other embodiments include the feed tool 10 having just a single one of these aspects. Still other embodiments may include the feed tool 10 having two or more of these aspects. In one specific embodiment, the tool 10 includes a lift ring 50 and a two-stage piston 60. In another specific embodiment, the tool 10 includes the torque overload clutch 70 and the two-stage piston 60. FIGS. 5 and 6 include an embodiment that includes a clutch 70, lift ring 50, and a two-stage piston 60.

The torque overload clutch 70 is one manner to shift the tool 10 between forward and retract operation. The clutch 70 includes matching ramps 85 on the contact faces of the differential drive gear 41 and differential feed gear 42. The ramps 85 mate together for the drive gear 41 to rotate the feed gear 42. The force of the biasing member 44 maintains engagement between the ramps 85 on the opposing gears 41, 42.

Figure 7:
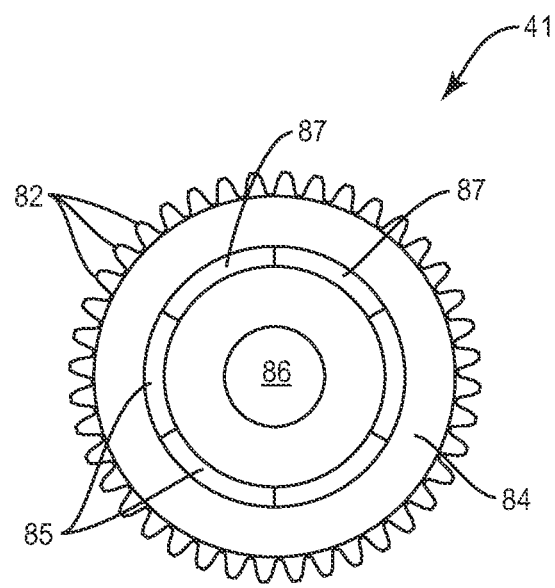
FIG. 7 is a top view of a differential drive gear with ramps that form a portion of a threshold clutch.
Figure 7A:
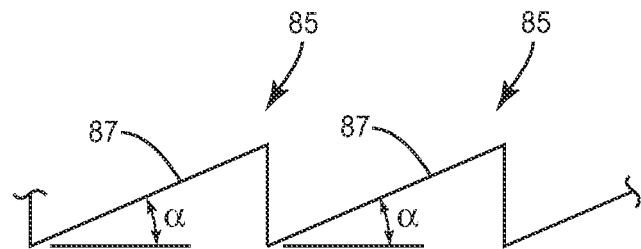
FIG. 7A is a side view of two of the ramps of FIG. 7.

FIG. 7 illustrates a top view of the differential drive gear 41 that includes a circular shape. A central opening 86 is sized to receive the feed shaft 40. The axial face 84 that faces towards the feed gear 42 includes ramps 85 that each includes a sloped cam face 87 as best illustrated in FIG. 7A. The cam faces 87 are aligned at an angle α with the face 84. The angle α may vary depending upon the extent of necessary engagement. In one or more embodiments as illustrated in FIG. 7, the ramps 85 extend completely around the central opening 86. Other embodiments may include different numbers and configurations of ramps 85. The differential feed gear 42 includes a similar configuration with corresponding ramps 85 that mate together. The ramps 85 on the opposing gears 42, 41 may include the same or different angles α.

Figure 8:
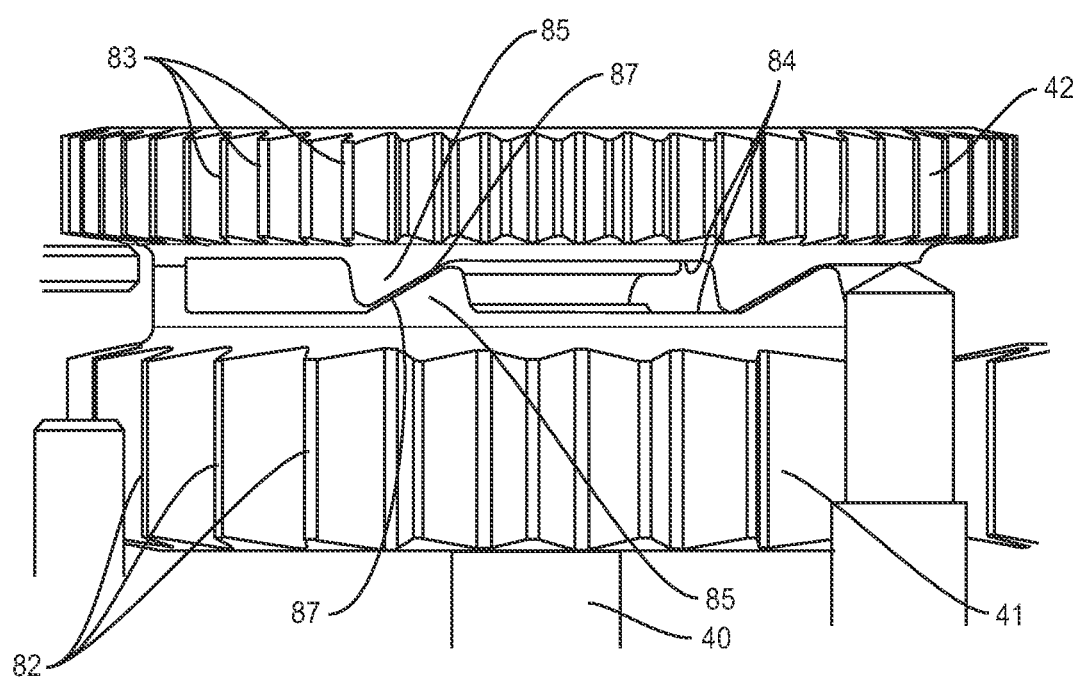
FIG. 8 is a side perspective view of a threshold clutch formed between a differential drive gear and a differential feed gear.

FIG. 8 illustrates the differential drive gear 41 and differential feed gear 42 mated together, such as when the tool 10 is operating in the advance direction. The cam faces 87 of the opposing ramps 85 contact together for the drive gear 41 to rotate the feed gear 42. The drive gear 41 also includes the gear teeth 82 along the periphery that engage with corresponding teeth on the spindle drive gear 31. Likewise, the feed gear 42 includes peripheral teeth 83 that engage with teeth on the spindle feed gear 32. The ramps 85 are held in contact at least by the biasing force applied to the gears 41, 42 by the biasing member 44. In the event that the differential feed gear 42 cannot be driven, then the two gears 41, 42 will separate along the axis of the differential feed shaft 40. The amount of torque for overload to cause the separation is a function of the force applied by the biasing member 44 and the angles α of the cam faces 87.

When the tool 10 is operating in the advance direction as illustrated in FIG. 5, the differential feed gear 42 is coupled to the differential drive gear 41 through the clutch 70 that includes the contacting ramps 85 that are held in contact by the bias force of the biasing member 44. The spindle feed gear 32 rotates at a differential speed relative to the spindle drive gear 31 hence causing the spindle 30 to advance. At the extent of movement of the spindle 30 in the advance direction, additional movement of the spindle 30 is stopped through the depth stop member 81 contacting against the support 80. At the contact between the depth stop 81 and the support 80, the drive to the spindle feed gear 32 is still occurring from the differential feed gear 42 (through the differential drive gear 41). As the spindle 30 is prevented from moving forward, the spindle feed gear 32 that is threaded onto the spindle 30 moves axially backwards against the biasing member 37. This structure is developed for "thrust overload" and is of particular advantage for tools that are used for countersinking where a small dwell period at the end of the spindle stroke is greatly advantageous for accurate countersink depth and maintaining a clean finish on the countersink form.

In one or more embodiments, the biasing member 37 includes one or more Belleville washers. In other embodiments they could be of a wave type or conventional compression springs. The member 37 has a preload approximately equal to the thrust rating of the gear head 14. It has been determined that wave washers may have drawbacks in that due to their ID/OD size they must be placed on top of the spindle feed gear 32. In one or more embodiments, the biasing member 37 includes one or more wave springs as they have a smaller OD for the same given ID and can hence be placed in parallel with the spindle feed gear 32. This keeps the overall height of the gear head 14 lower which is advantageous as it allows the tool 10 to reach into more confined spaces.

The backward movement of the spindle feed gear 32 along the spindle 30 causes the gear 32 to move against the biasing member 37. This results in additional torque being needed through the differential feed gear 42 to rotate the spindle feed gear 32. This additional torque in return requires additional torque to be supplied by the differential drive gear 41. The additional torque required between the differential drive and feed gears 41, 42 causes the cam faces 87 to slide against each other and for the gears 41, 42 to axially separate.

Figure 9:
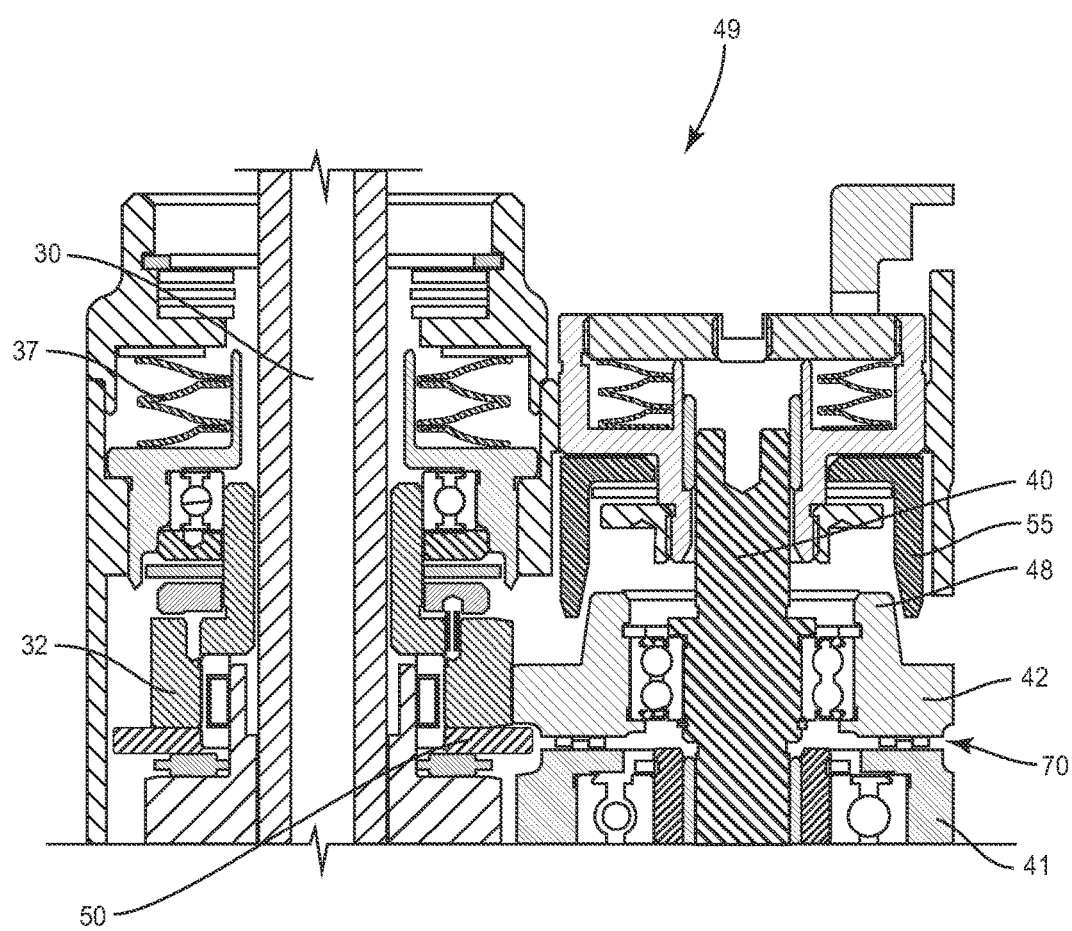
FIG. 9 is a side schematic view of a spindle feed gear with a lift ring and a holding mechanism to prevent rotation of a differential feed gear.

In one or more embodiments, a holding mechanism is included along the differential unit 49 to prevent rotation of the differential feed gear 42 when the tool 10 is operating in the retract direction. In one embodiment as illustrated in FIG. 9, the holding mechanism includes a cone clutch. The top of the differential feed gear 42 includes a male cone 48 with a tapered width. Further, a female cone 55 is positioned adjacent to the differential feed gear 42 and extends around the feed shaft 40. In one or more embodiments, the female cone 55 is held stationary during engagement with the differential feed gear 42. The cone angle between the cones 48, 55 is designed to create a holding force to prevent rotation of the differential feed gear 42 but still allow axial movement of the differential feed gear 42 (i.e., the angle should not create a taper lock). When the tool 10 is in retract, the differential feed gear 42 is forced upward through the sliding cam faces 87 of the clutch mechanism 70. This upward movement forces the male cone 48 into the female cone 55 thus preventing rotation. FIG. 9 includes an embodiment with the differential feed gear 42 including the male cone 48. Other embodiments may reverse the male and female cones 48, 55.

Figure 10:
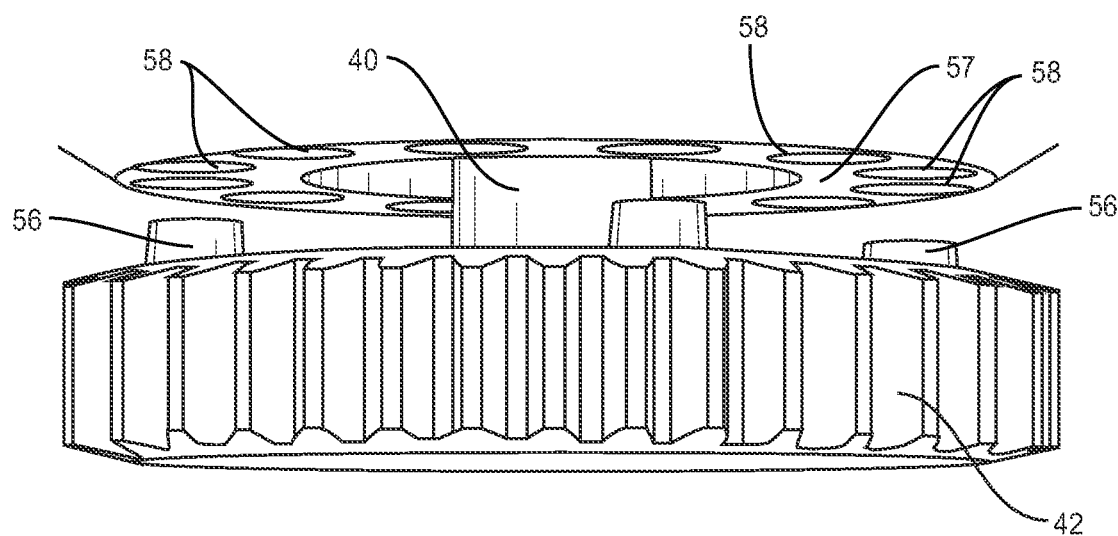
FIG. 10 is a side perspective view of a holding mechanism to prevent rotation of a differential feed gear.

The holding mechanism may also include dog clutch as illustrated in FIG. 10. The differential feed gear 42 includes one or more pins 56 that extend axially upward from a top face. An engagement member 57 is positioned along the feed shaft 40 above the differential feed gear 42. The engagement member 57 includes one or more apertures 58 that align with the one or more pins 56. When the differential feed gear 42 moves axially caused by the sliding of the cam faces 87, the pins 56 are inserted into the apertures 58 thus preventing additional rotation. This configuration may also be reversed with the differential feed gear 42 including apertures that receive pins that extend from the engagement member 57.

In use, the differential feed gear 42 remains engaged with the spindle feed gear 32 through the gear teeth. As the cam faces 87 slide across one another due to the increased torque requirements, the differential feed gear 42 moves axially away from the differential drive gear 41. In one or more embodiments, the differential feed gear 42 slides axially relative to the spindle feed gear 32 due to one or more of the spindle feed gear 32 moving axially along the spindle 32 and the differential feed gear 42 moving axially away from the differential drive gear 41. Continued rotation of the differential drive gear 41 causes further sliding along the cam faces 87 thus forcing the gears 41, 42 farther apart until the gears 41, 42 eventually disengage. Once disengaged, the differential feed gear 42 contacts the holding mechanism to prevent further rotation. This in turn prevents rotation of the spindle feed gear 32. Although the gears 32,42 may move relative to one another, the gears 32,42 remain engaged through their gear teeth.

In another embodiment, or in combination with the clutch 70, the spindle feed gear 32 includes a lift ring 50. As illustrated in FIG. 9, the ring 50 extends under the differential feed gear 42 and in an advance feed operation is just below the bottom face of the differential feed gear 42. At the end of stroke or thrust overload condition the spindle feed gear 32 moves backward along the spindle 30 as described above. As the spindle feed gear 32 moves axially along the spindle 30, the lift ring 50 acts on the differential feed gear 42 and initiates the movement of it towards the second position used for retracting the tool (i.e., away from the differential drive gear 31). The lift ring 50 may axially move the differential feed gear 42 an axial distance to disengage from the differential drive gear 41. In one or more embodiments, the lift ring 50 may also move the differential feed gear 42 a distance to engage with the holding mechanism to prevent rotation.

In one or more embodiments, the lift ring 50 may be attached to the spindle feed gear 32. The lift ring 50 and feed gear 32 may be formed as an integral part, such as being molded together as a single, unitary construction. The lift ring 50 may also be attached to the underside of the feed gear 32 through one or more mechanical fasteners and/or adhesives. The lift ring 50 may also be a separate element that is held in contact against the underside of the feed gear 32 by a biasing member 38 (see FIGS. 5, 6).

Figure 11B:
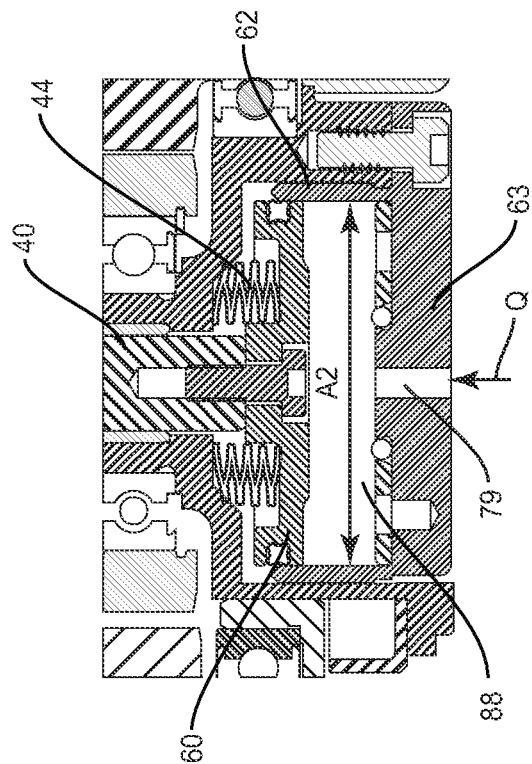
FIG. 11B is a side sectional view of a piston in a second position spaced away from the inlet with the tool in a retract operation.
Figure 11A:
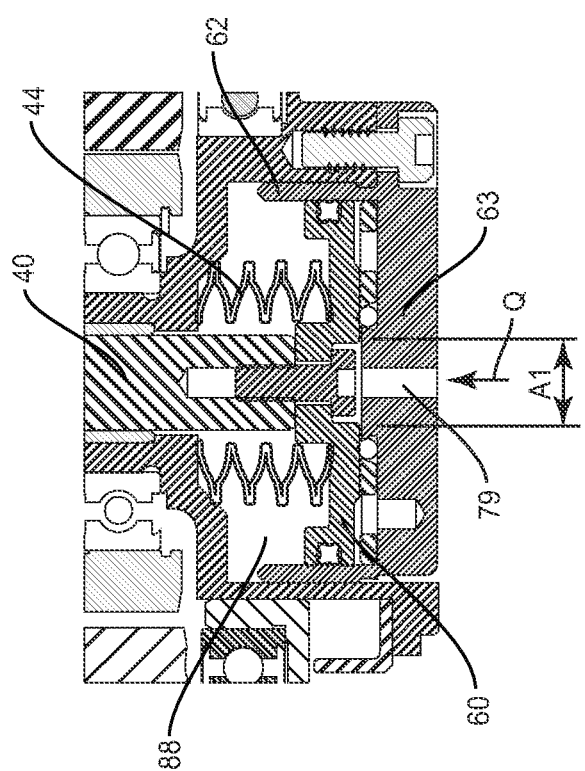
FIG. 11A is a side sectional view of a piston in a first position across an inlet with the tool in a forward feed operation.

In one or more embodiments, the torque clutch 70 and/or lift ring 50 axially move the differential feed gear 42 a limited amount to disengage from the differential drive gear 41. The piston 60 may be further configured to provide additional axial movement of the differential feed gear 42. The piston 60, feed shaft 40, and differential feed gear 42 are connected together to axially move as a unit. As illustrated in FIGS. 11A and 11B, the piston 60 is positioned in the cylinder 88 that includes the outer walls 62 and a bottom wall 63. The cross-sectional shape of the cylinder 88 matches the piston 60 such that the piston 60 extends across the cylinder 88 and the piston 60 is able to move axially within the cylinder 88. The bottom wall 63 includes an inlet 79 with a reduced area A1 that is less than the area of the cylinder 88. Air from the air logic system is moved in the direction of arrow Q towards the inlet 61.

When the tool 10 is operating in the forward direction as illustrated in FIG. 11A, the piston 60 is positioned at the bottom wall 63 and extends over the inlet 61. Thus, the air acts on just the portion of the piston 60 equal to area A1 that is exposed through the inlet 61. The force of the biasing member 44 pressing downward on the piston 60 is greater than the force exerted by the air on the reduced area A1 of the piston 60. Thus, the piston 60 (and the attached feed shaft 40 and differential feed gear 42) remain in the same axial position.

Once the movement of the differential feed gear 42 is initiated through the lift ring 50 and/or threshold clutch 70, the piston 60 also moves axially in the cylinder 88 away from the bottom wall 63 as it is coupled to the differential feed gear 42 through the differential feed shaft 40. The bottom of the piston 60 moves away from the inlet 61 thus allowing air to act on a larger area A2 of the piston 60. This results in a larger force being supplied through the air. The larger force overcomes the biasing member 44 and axially moves the piston 60 and thus also moves the differential feed gear 42 into contact with the holding mechanism. The position of the air ready to move the piston 60 greatly reduces the time to shift the differential feed gear 42 from the forward position to the retract position. This also greatly reduced the possibility of jamming.

The various biasing members may include a variety of different configurations. The biasing members may include a single member, or multiple members. The multiple members may be the same or may be different. The members may include, but are not limited to Belleville washers, wave washers, wave springs, magnets, and compression springs.

In one or more embodiments, the tool 10 includes a lift ring 50, a clutch 70, and a two-stage piston 60. The tool 10 may also include various other combinations. In one or more embodiments, the tool 10 includes a lift ring 50 and a two-stage piston 60. In one or more embodiments, the tool 10 includes a threshold clutch 70 and a two-stage piston 60.

The differential drive gear 41 may be engaged with the differential feed gear 42 in a variety of different configurations. One embodiment includes the clutch mechanism 70 described above. Other embodiments include but are not limited to pin and hole drive, and a 90 degree face drive (dog drive).

The motor 12 may be pneumatic powered or electric powered. The motor 12 is configured to provide a rotational force to the differential drive gear 41 to rotate the other elements including the spindle 30 as described above. In one or more embodiments that use an electric motor 12, a separate air source controlled through an air logic system provides for movement of the two-stage piston 60.

Figure 12:
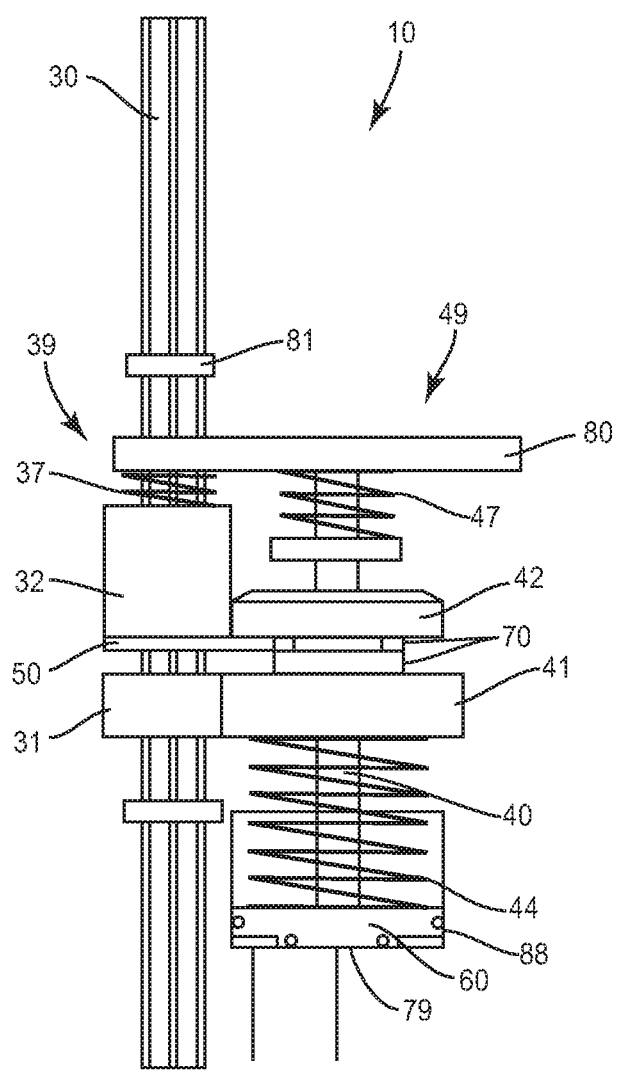
FIG. 12 is a side schematic side view of components of a tool operating in an advance direction.

In one or more embodiments, a biasing member 44 is positioned along the differential unit 49 between the piston 60 and the differential drive gear 41 (i.e., below the differential drive gear 41 as illustrated in FIGS. 3A and 3B). In one or more embodiments as illustrated in FIG. 12, a biasing member 47 may be positioned along the differential unit 49 between a support 80 and the differential feed gear 42. This biasing member 47 applies a force along the differential unit 49 to maintain the differential drive gear 41 and differential feed gear 42 in axial contact. In one or more embodiments, the differential unit 49 includes both biasing members 44, 47. In one or more embodiments, the differential unit 49 includes just one of the biasing members 44, 47.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A positive feed tool configured to operate in a first mode and a second mode, the feed tool comprising:
    an elongated spindle adapted to carry a tool bit and to rotate and to move axially along a feed path, the spindle configured to operate in a first mode to move axially along the feed path in a first direction and a second mode to move axially along the feed path in an opposing second direction, the spindle further configured to prevent movement in the first direction beyond a stop position;
    a spindle drive mechanism connected to the spindle to rotate the spindle;
    a differential feed gear that engages with and is rotated by the spindle drive mechanism, the differential feed gear spaced away from the spindle;
    a spindle feed gear connected to the spindle to axially move the spindle along the feed path, the spindle feed gear engaged with and rotated by the differential feed gear;
    the first mode including the spindle drive mechanism engaged with the spindle to rotate the spindle and engaged with the differential feed gear to rotate the spindle feed gear, the spindle feed gear being located at a first axial position along the feed path, the spindle drive mechanism and the differential feed gear being a first axial distance apart;
    the second mode including the spindle feed gear moves to a different second axial position along the feed path and the differential feed gear a greater second distance axially apart from and disengaged from the spindle drive mechanism;
    the spindle configured to transition from the first mode to the second mode in response to the spindle feed gear axially being moved along the feed path from the first position to the second position.

2. The feed tool of claim 1, further comprising a lift ring that axially moves along the feed path with the spindle feed gear, the lift ring extending radially outward beyond the spindle feed gear to contact against the differential feed gear when the spindle feed gear moves from the first axial position to the second axial position.

3. The feed tool of claim 2, wherein the lift ring and the spindle feed gear are a single component.

4. The feed tool of claim 2, wherein the lift ring extends around the spindle and includes a central opening that receives the spindle.

5. The feed tool of claim 1, further comprising one or more ramps that extend axially outward from each of the spindle drive mechanism and the differential feed gear, the ramps each including cam surfaces that contact together to engage together the spindle drive mechanism and the differential feed gear in the first mode.

6. The feed tool of claim 1, further comprising a biasing member that acts on the spindle feed gear to prevent movement of the spindle feed gear from the first axial position to the second axial position.

7. The feed tool of claim 1, further comprising an air motor that applies a force to the spindle drive mechanism to rotate the differential feed gear and the spindle feed gear.

8. The feed tool of claim 1, further comprising a piston operatively connected to the differential feed gear through a shaft, the piston being positioned in a cylinder that includes an air inlet.

9. A method of initiating a shift in a spindle direction in a positive feed tool, the method comprising:
    rotating a spindle drive mechanism that is connected to a spindle thereby rotating the spindle;
    rotating the spindle drive mechanism thereby rotating a differential feed gear that is engaged with the spindle drive mechanism;
    rotating the differential feed gear thereby rotating a spindle feed gear that is engaged with the differential feed gear;
    rotating the spindle feed gear that is connected to the spindle while the spindle is rotating and moving the spindle in a first direction along a feed path;
    preventing the spindle from moving in the first direction while continuing to rotate the spindle and the spindle feed gear and begin moving the spindle feed gear axially along the spindle in an opposing second direction along the feed path;
    moving the spindle feed gear axially along the spindle in the second direction and moving the differential feed gear away from the spindle drive mechanism and disengaging the differential feed gear from the spindle drive mechanism; and
    stopping rotation of the spindle feed gear while continuing to rotate the spindle and moving the spindle in the second direction along the feed path.

10. The method of claim 9, further comprising contacting a lift ring that extends radially outward from the spindle feed gear against the differential feed gear while the spindle feed gear is moving axially along the spindle in the second direction and moving the differential feed gear away from the spindle drive mechanism.

11. The method of claim 10, wherein the lift ring is integrally formed with the spindle feed gear.

12. The method of claim 9, further comprising moving the spindle feed gear against a biasing member while moving the spindle feed gear axially along the spindle in the second direction and increasing a torque necessary to rotate the spindle feed gear.

13. The method of claim 9, further comprising sliding cam faces on the spindle drive mechanism against opposing cam faces on the differential feed gear and moving the differential feed gear away from the spindle drive mechanism.

14. The method of claim 9, further comprising applying air pressure against a piston that is connected to the differential feed gear and moving the differential feed gear away from the spindle drive mechanism.

15. The method of claim 9, further comprising exposing a limited area of a piston that is connected to the differential feed gear to air flow that is moving through an air inlet prior to the moving the differential feed gear away from the spindle drive mechanism and exposing a larger area of the piston to the air flow after the differential feed gears begins to move away from the spindle drive mechanism.

* * * * *